United States Patent
Shchygel

(10) Patent No.: US 10,402,454 B1
(45) Date of Patent: Sep. 3, 2019

(54) OBTAINING PLATFORM-SPECIFIC INFORMATION IN A FIRMWARE EXECUTION ENVIRONMENT

(71) Applicant: American Megatrends, Inc., Norcross, GA (US)

(72) Inventor: Artem Shchygel, Lawrenceville, GA (US)

(73) Assignee: American Megatrends International, LLC, Norcross, GA (US)

(*) Notice: Subject to any disclaimer, the term of this patent is extended or adjusted under 35 U.S.C. 154(b) by 544 days.

(21) Appl. No.: 15/041,595

(22) Filed: Feb. 11, 2016

(51) Int. Cl.
G06F 16/903 (2019.01)
G06F 16/14 (2019.01)

(52) U.S. Cl.
CPC ...... *G06F 16/90335* (2019.01); *G06F 16/148* (2019.01)

(58) Field of Classification Search
CPC ......... G06F 17/30979; G06F 17/30011; G06F 17/30091; G06F 17/30106; G06F 17/30233; G06F 17/30256; G06F 16/24552; G06F 16/148
USPC ..... 707/769, 999.003; 713/1, 2, 168; 714/48
See application file for complete search history.

(56) References Cited

U.S. PATENT DOCUMENTS

| | | | | |
|---|---|---|---|---|
| 8,370,618 B1* | 2/2013 | Yakovlev | ............. | G06F 13/102 709/222 |
| 2004/0267708 A1* | 12/2004 | Rothman | ............ | G06F 11/2284 |
| 2004/0268107 A1* | 12/2004 | Zimmer | ................ | G06F 9/4408 713/1 |
| 2005/0149729 A1* | 7/2005 | Zimmer | ................ | G06F 21/575 713/168 |
| 2007/0061634 A1* | 3/2007 | Marisetty | ............ | G06F 11/0793 714/48 |

(Continued)

OTHER PUBLICATIONS

Unified Extensible Firmware Interface Specification, Version 2.6, published Jan. 2016 by Unified EFI, Inc., copyright 2006-2016, [online][retrieved on Feb. 11, 2016] retrieved from: http://www.uefi.org/sites/default/files/resources/UEFI%20Spec%202_6.pdf, cover, plus pp. 418-426.

*Primary Examiner* — Dung K Chau
(74) *Attorney, Agent, or Firm* — Newport IP, LLC

(57) ABSTRACT

Technologies are described herein for obtaining platform-specific information in a firmware execution environment. A platform-to-driver configuration protocol executes within the firmware execution environment. The platform-to-driver configuration protocol receives a request for platform-specific information from a firmware driver that is also executing in conjunction with the firmware execution environment. The platform-to-driver configuration protocol discovers one or more platform-to-driver agents also executing in the firmware execution environment. The platform-to-driver configuration protocol then queries at least a portion of the platform-to-driver agents to identify one of the platform-to-driver agents as a provider of the requested platform-specific information. A communications session can then be established between the requesting firmware driver and the platform-to-driver agent identified as the provider of the requested platform-specific information. The requested platform-specific information is then obtained from the appropriate platform-to-driver agent and provided to the firmware driver that requested the platform-specific information.

20 Claims, 5 Drawing Sheets

(56) References Cited

U.S. PATENT DOCUMENTS

2008/0196043 A1\* 8/2008 Feinleib .............. G06F 11/0712
719/319

\* cited by examiner

OBTAINING PLATFORM-SPECIFIC INFORMATION IN A FIRMWARE EXECUTION ENVIRONMENT

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. In some types of computer systems, the Basic Input/Output System ("BIOS") has been a de facto standard defining a firmware interface.

The BIOS, however, is now being replaced by more capable Extensible Firmware Interface ("EFI")-compatible firmware. EFI-compatible firmware can be configured according to a specification released by the Unified EFI ("UEFI") Forum (the "UEFI Specification"). Such a firmware might be referred to herein as a UEFI Specification-compliant firmware, a UEFI-compatible firmware, or a UEFI firmware.

UEFI firmware has the capability to execute firmware drivers that enable the utilization of various types of hardware and services. In some cases, firmware drivers require access to information that is specific to a particular hardware platform (referred to herein as "platform-specific information"). For example, a firmware driver for enabling the use of a network adapter might require the media access control ("MAC") address of the network adapter. Other types of firmware drivers might require access to other types of platform-specific information.

It is with respect to these and other considerations that the disclosure made herein is presented.

SUMMARY

Technologies are described herein for obtaining platform-specific information in a firmware execution environment. Through an implementation of the technologies and concepts presented herein, firmware drivers can easily obtain platform-specific information from a UEFI-compatible protocol, which is referred to herein as the "platform-to-driver configuration protocol." The platform-specific information can be provided by platform-to-driver agents that operate in conjunction with the platform-to-driver configuration protocol. Through the use of the platform-to-driver agents, storage space can be reduced through the inclusion in a firmware of only those platform-to-driver agents needed for a particular platform.

Moreover, a single version of the platform-to-driver configuration protocol can be utilized for multiple different platforms, thereby making maintenance of the platform-to-driver configuration protocol simpler as compared to implementations that require a different version of the platform-to-driver configuration protocol for each unique platform. Additionally, utilization of multiple platform-to-driver agents can permit granular identification and resolution of issues within both the platform-to-driver configuration protocol and the platform-to-driver agents. Technical benefits other than those mentioned specifically herein can also be realized through an implementation of the disclosed technologies.

According to one aspect presented herein, a computer-implemented mechanism is disclosed for obtaining platform-specific information in a firmware execution environment, such as that provided by a UEFI-compatible firmware. In one particular configuration, a platform-to-driver configuration protocol executes within the firmware execution environment. The platform-to-driver configuration protocol receives a request for platform-specific information from a firmware driver, such as a UEFI-compatible firmware driver, that is also executing in conjunction with the firmware execution environment. The platform-specific information might, for example, comprise information that is specific to a hardware platform that provides the firmware execution environment. For example, and without limitation, the MAC address of a network adapter in a specific platform is platform-specific information. Other types of platform-specific information can also be obtained utilizing the mechanisms disclosed herein.

Prior to or responsive to receiving a request for platform-specific information, the platform-to-driver configuration protocol discovers one or more platform-to-driver agents also executing in the firmware execution environment. The platform-to-driver agents are also implemented as UEFI-compatible protocols in one specific implementation. The platform-to-driver configuration protocol then queries at least a portion of the platform-to-driver agents to identify one of the platform-to-driver agents as a provider of the requested platform-specific information.

A communications session can then be established between the requesting firmware driver and the platform-to-driver agent identified as the provider of the requested platform-specific information. The requested platform-specific information is then obtained from the appropriate platform-to-driver agent and provided to the firmware driver that requested the platform-specific information.

It should be appreciated that the above-described subject matter can also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
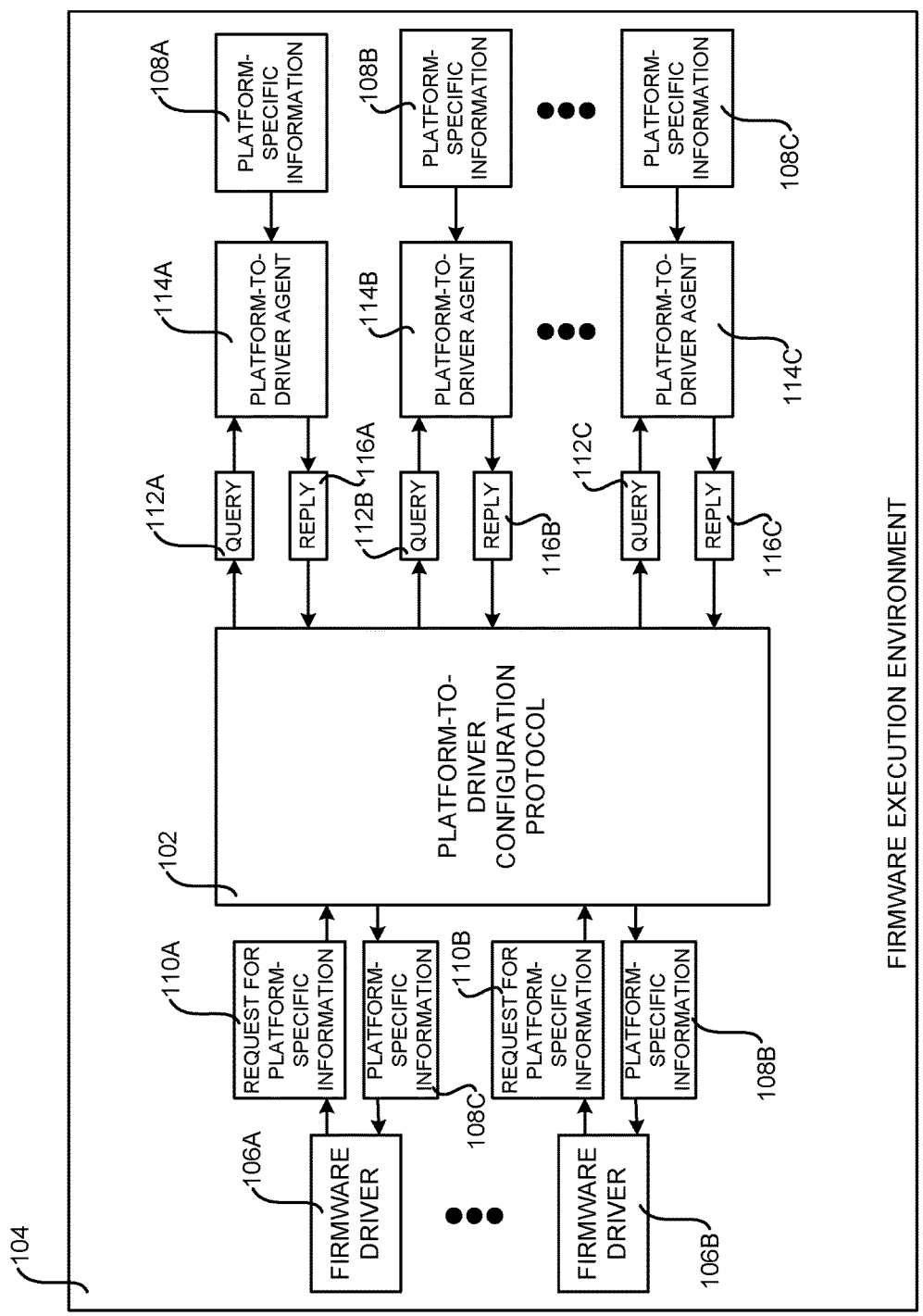
FIG. 1 is a software architecture diagram that illustrates aspects of one mechanism disclosed herein for obtaining platform-specific information in a firmware execution environment.

Technologies for obtaining platform-specific information in a firmware execution environment are disclosed herein. In the following detailed description, references are made to the accompanying drawings that form a part hereof, and in which are shown by way of illustration specific configurations or examples. Referring now to the drawings, in which like numerals represent like elements throughout the several FIGS., aspects of an exemplary operating environment and the various technologies provided herein will be described.

While the configurations presented herein are described in the general context of program modules that execute in conjunction with the execution of a computer firmware, those skilled in the art will recognize that various configurations can also be implemented in combination with other program modules. Generally, program modules include routines, programs, components, data structures, and other types of structures that perform particular tasks or implement particular abstract data types. Moreover, those skilled in the art will appreciate that the invention can be practiced with other computer system configurations, including handheld devices, multiprocessor systems, microprocessor-based or programmable consumer electronics, minicomputers, mainframe computers, embedded systems, and the like. Configurations presented herein can also be practiced in distributed computing environments where tasks are performed by remote processing devices that are linked through a communications network. In a distributed computing environment, program modules can be located in both local and remote memory storage devices.

FIG. 1 is a software architecture diagram that illustrates aspects of one mechanism disclosed herein for obtaining platform-specific information in a firmware execution environment 104, such as that provided by a UEFI-compatible firmware. In one particular configuration, a platform-to-driver configuration protocol 102 executes within the firmware execution environment 104.

In one particular configuration, the firmware execution environment 104 comprises the driver execution environment ("DXE") phase of execution of a UEFI-compatible firmware. In this example, the platform-to-driver configuration protocol 102 is produced by the UEFI-compatible firmware and consumed by the firmware drivers 106. The platform-to-driver configuration protocol 102 can expose a UEFI-Specification compatible interface through which the firmware drivers 106 can submit requests 110 for platform-specific information 108. In one configuration, the requests 110 include a controller handle and/or a child handle for the controller or other type of device that the firmware driver 106 is configured to control. Other types of data can also be provided in a request 110.

The platform-to-driver configuration protocol 102 receives a request 110A for platform-specific information 108A from a firmware driver 106A, such as a UEFI-compatible firmware driver, that is also executing in conjunction with the firmware execution environment 104. The firmware driver 106A might, for example, be a device, bus, service, or hybrid bus/device driver. The firmware driver 106A might comprise a driver for another type of hardware device or service in other configurations.

As mentioned briefly above, the platform-specific information 108A might, for example, comprise information that is specific to a hardware platform that provides the firmware execution environment 104. For example, and without limitation, the MAC address of a network adapter in a specific platform is platform-specific information. Other types of platform-specific information 108 can also be obtained utilizing the mechanisms disclosed herein.

Prior to or responsive to receiving a request 110 for platform-specific information, such as the request 110A, the platform-to-driver configuration protocol 102 discovers one or more platform-to-driver agents 114A-114C, which are also executing in the firmware execution environment 104. The platform-to-driver agents 114A-114C are also implemented as UEFI-compatible protocols in one specific implementation. In this implementation, the platform-to-driver configuration protocol 102 can utilize the UEFI-specific protocol discovery mechanisms (e.g. "LocateProtolcol( )" provided by UEFI Boot Services) to discover the platform-to-driver agents 114A-114C that are available within the firmware execution environment 104.

The platform-to-driver configuration protocol 102 then queries at least a portion of the platform-to-driver agents 114A-114C to identify one of the platform-to-driver agents 114A-114C as a provider of the requested platform-specific information 108. As shown in FIG. 1, for example, the platform-to-driver configuration protocol 102 can transmit queries 112A-112C to the platform-to-driver agents 114A-114C sequentially. The query 112 can include the controller handle and/or the child handle passed from the firmware driver 106 in the original request 110. The query 112 can include other types of information in other configurations. Each platform-to-driver agent 114A-114C can respond with a reply 116A-116C, respectively, indicating whether it is a provider of the requested platform-specific information 108A. Additional details regarding this process are provided below.

Once the platform-to-driver agent 114 that provides the requested platform-specific information 108 has been identified, the platform-to-driver configuration protocol 102 can establish a communications session between the requesting firmware driver 106 and the platform-to-driver agent 114 identified as the provider of the requested platform-specific information 108. The requested platform-specific information 108 is then obtained from the appropriate platform-to-driver agent 114 and provided to the firmware driver 106 that requested the platform-specific information 108.

In the example shown in FIG. 1, for instance, the firmware driver 106A might first transmit a request 110A for platform-specific information 108C that is provided by the platform-to-driver agent 114C. In this example, the platform-to-driver configuration protocol 102 might first transmit a query 112A to the platform-to-driver agent 114A to determine whether the platform-to-driver agent 114A is a provider of the requested platform-specific information 108C. Because the platform-to-driver agent 114A is not a provider of the requested platform-specific information 108C, the platform-to-driver agent 114A will return a reply 116A indicating that it is not a provider of the requested platform-specific information 108C.

Next, the platform-to-driver configuration protocol 102 will transmit a query 112B to the platform-to-driver agent 114B to determine whether the platform-to-driver agent 114B is a provider of the requested platform-specific information 108C. Because the platform-to-driver agent 114B is also not a provider of the requested platform-specific information 108C, the platform-to-driver agent 114B will return a reply 116B indicating that it is not a provider of the requested platform-specific information 108C.

Finally, the platform-to-driver configuration protocol 102 will transmit a query 112C to the platform-to-driver agent 114C to determine whether the platform-to-driver agent 114C is a provider of the requested platform-specific information 108C. Because the platform-to-driver agent 114C is a provider of the requested platform-specific information 108C, the platform-to-driver agent 114C will return a reply 116C indicating that it is a provider of the requested platform-specific information 108C. Because the platform-to-driver agent 114C is a provider of the requested platform-specific information 108C, the platform-to-driver configuration protocol 102 will establish a communications channel between the firmware driver 106A and the platform-to-driver agent 114C, whereby the firmware driver 106A can obtain the platform-specific information 108C from the platform-to-driver agent 114C.

Once the firmware driver 106A has obtained the platform-specific information 108C from the platform-to-driver agent 114C, a request 110B can be received from the firmware driver 106B for the platform-specific information 108B in this example. The discovery process discussed above can then be repeated until the platform-to-driver configuration protocol 102 identifies the platform-to-driver agent 114B as the provider of the platform-specific information 108B. The platform-to-driver configuration protocol 102 will then establish a communications channel between the firmware driver 106B and the platform-to-driver agent 114B, whereby the firmware driver 106B can obtain the platform-specific information 108B from the platform-to-driver agent 114B. This process can continue for additional firmware drivers 106 until each firmware driver 106 has obtained the platform-specific information 108 that it requires. Additional details regarding this process will be provided below with regard to FIG. 2.

Figure 2:
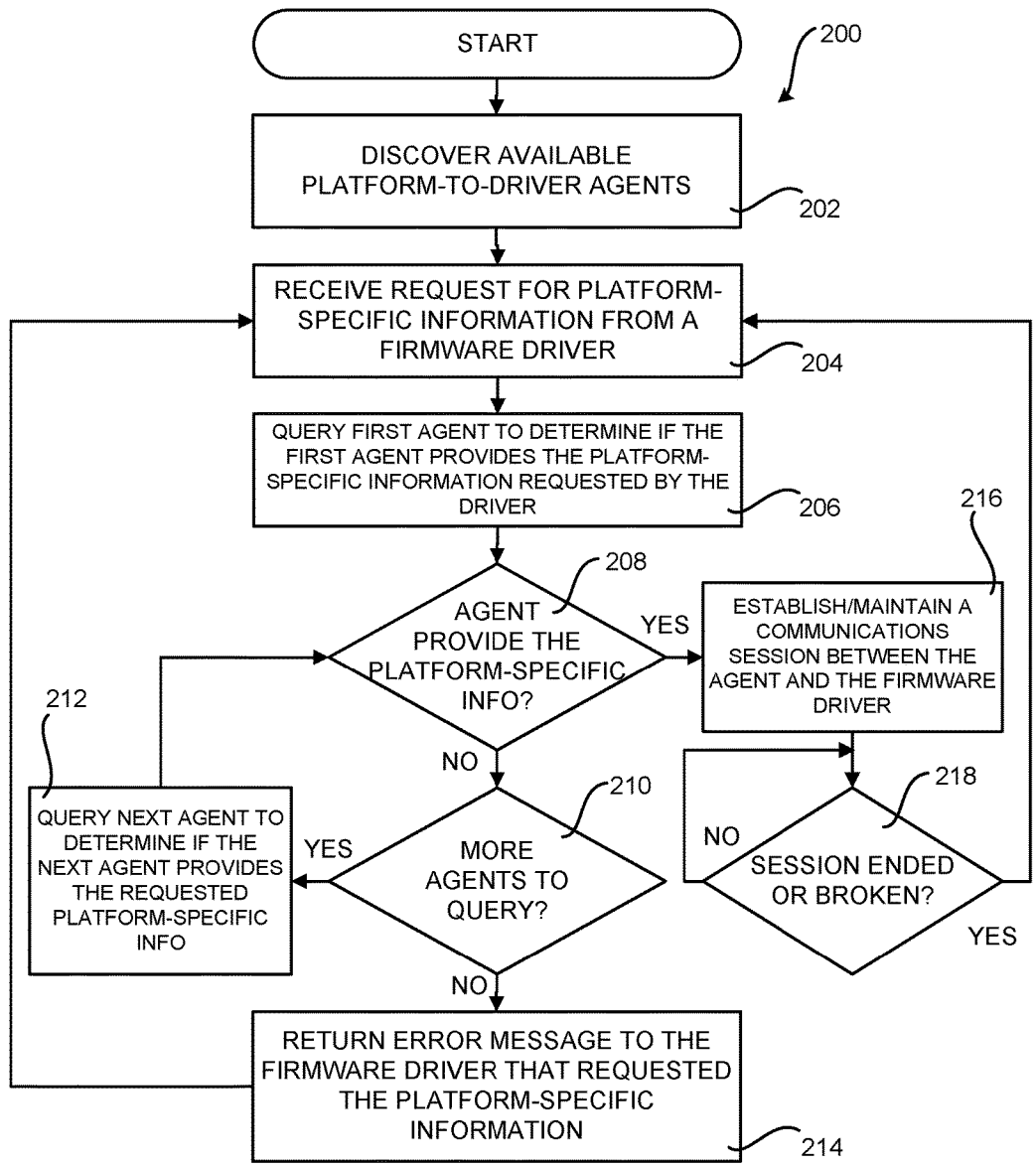
FIG. 2 is a flow diagram that illustrates aspects of one routine disclosed herein for obtaining platform-specific information in a firmware execution environment.

FIG. 2 is a flow diagram showing a routine 200 that illustrates aspects of a process for obtaining platform-specific information 108 in a firmware execution environment 104 according to one configuration disclosed herein. The process illustrated in FIG. 2 can be performed by a platform-to-driver configuration protocol 102 executing in an UEFI-compatible firmware in one particular configuration. This process might be performed by other components in other types of firmware execution environments 104.

It should be appreciated that the logical operations described herein with regard to FIG. 2 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein.

The routine 200 begins at operation 202, where the platform-to-driver configuration protocol 102 discovers one or more platform-to-driver agents 114A-114C, which are also executing in the firmware execution environment 104. As discussed above, the platform-to-driver agents 114A-114C are implemented as UEFI-compatible protocols in one specific implementation. As also mentioned above, in this implementation, the platform-to-driver configuration protocol 102 can utilize the UEFI-specific protocol discovery mechanisms (e.g. "LocateProtolcol( )" provided by UEFI Boot Services) to discover the platform-to-driver agents 114A-114C that are available within the firmware execution environment 104.

From operation 202, the routine 200 proceeds to operation 204, where the platform-to-driver configuration protocol 102 receives a request 110A for platform-specific information 108A from a firmware driver 106A, such as a UEFI-compatible firmware driver, that is also executing in conjunction with the firmware execution environment 104. As mentioned above, the firmware driver 106A might, for example, be a device, bus, service, or hybrid bus/device driver.

From operation 204, the routine 200 proceeds to operation 206, where the platform-to-driver configuration protocol 102 then queries the first platform-to-driver agent 114 (e.g. the agent 114A) to determine if the queried agent 114 is a provider of the requested platform-specific information 108. As shown in FIG. 1, for example, the platform-to-driver configuration protocol 102 might first transmit a query 112A to the platform-to-driver agent 114A. The platform-to-driver agent 114A will then respond with a reply 116A indicating whether it is a provider of the requested platform-specific information 108.

The routine 200 then proceeds from operation 206 to operation 208, where the platform-to-driver configuration protocol 102 determines whether the agent 114 queried at operation 206 is the provider of the requested platform-specific information 108. If not, the routine 200 proceeds to operation 210, where the platform-to-driver configuration protocol 102 determines whether there are additional agents 114 to be queried. If additional agents 114 remain to be queried, the routine 200 proceeds from operation 210 to operation 212, where additional agents can be queried in a similar manner (e.g. the agent 114B, the agent 114C, and so on). If no additional agents 114 remain to be queried, the routine 200 proceeds from operation 210 to operation 214, where an error message can be returned to the firmware driver 106 that requested the platform-specific information 108. The routine 200 then proceeds from operation 214 to operation 204, where additional requests 110 can be processed in a similar manner.

If, at operation 208, the platform-to-driver configuration protocol 102 determines that the agent 114 queried at operation 206 is a provider of the requested platform-specific information 108, the routine 200 proceeds from operation 208 to operation 216. At operation 216, the platform-to-driver configuration protocol 102 establishes a communications session between the requesting firmware driver 106 and the platform-to-driver agent 114 identified as the provider of the requested platform-specific information 108. The requested platform-specific information 108 is then obtained from the appropriate platform-to-driver agent 114 and provided to the firmware driver 106 that requested the platform-specific information 108. At operation 218, a determination is made as to whether the communications session has ended or has been broken (e.g. by the receipt of a request 110 from another firmware driver 106 or two consecutive requests 110 to the platform-to-driver configuration protocol 102 without a response from the calling driver 106. If the communications session has ended or has been broken, the routine 200 proceeds back to operation 204, where additional requests 110 can be processed in the manner described above.

Figure 3:
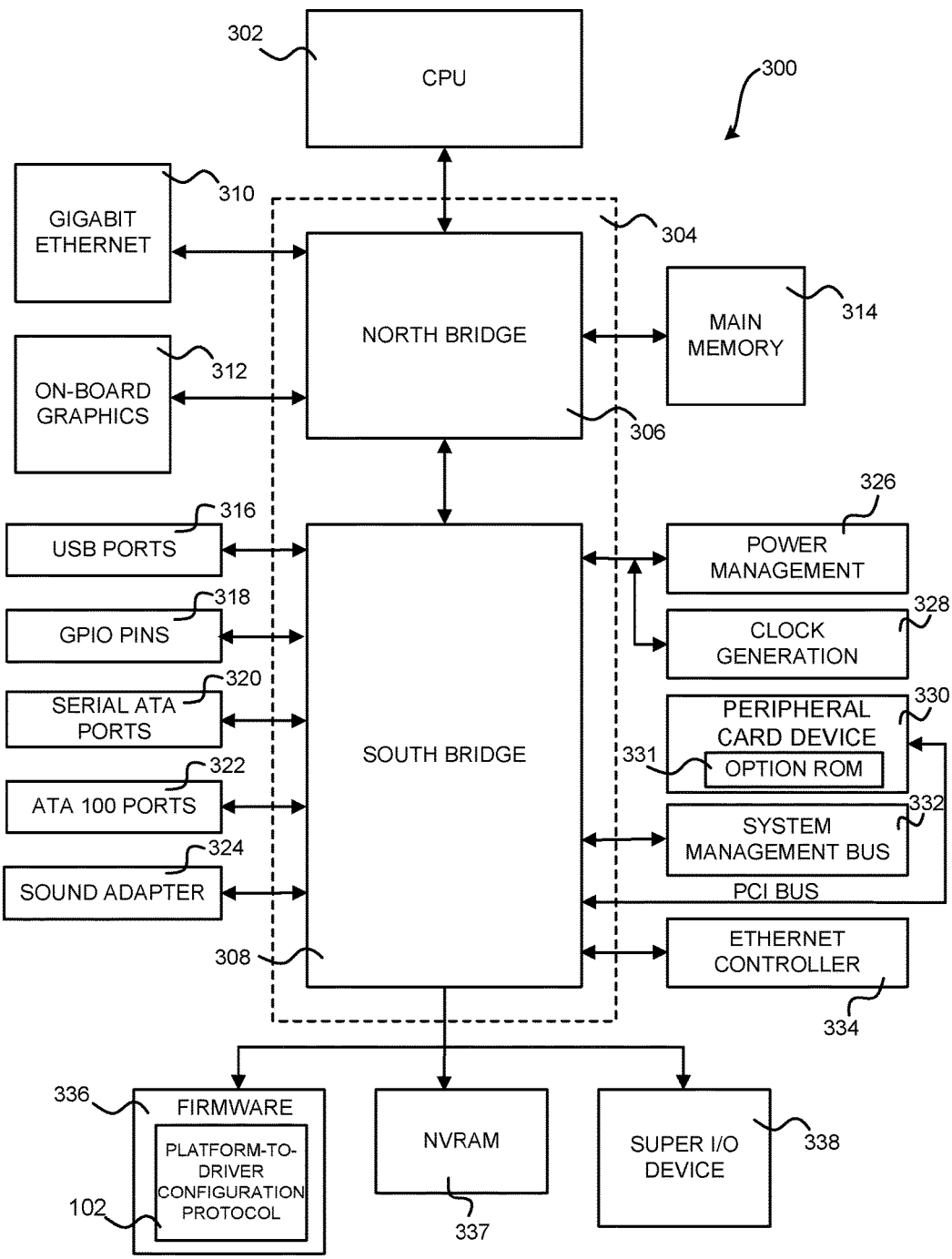
FIG. 3 is a computer architecture diagram that illustrates various components of a computing device that has been configured to provide the functionality disclosed herein.

Referring now to FIG. 3, an illustrative computer architecture capable of implementing the various technologies discussed herein will be described. It should be appreciated that although the configurations described herein are discussed primarily in the context of a conventional desktop, laptop, or server computer, the configurations can be utilized with virtually any type of computing device that utilizes a firmware, such as a UEFI-compatible firmware, to control aspects of its operation.

In order to provide the functionality described herein, the computer 300 can include a baseboard, or motherboard (not shown in FIG. 3). The motherboard can be a printed circuit board to which some or all of the components shown in FIG. 3 can be connected by way of a system bus or other electrical communication path. In one illustrative configuration, the motherboard includes one or more central processing units ("CPU") 302 configured to operate in conjunction with a chipset 304. The CPU 302 can be a central processor that performs arithmetic and logical operations necessary for the operation of the computer. For example, the CPU 302 might be a CPU available from INTEL CORPORATION, AMD CORPORATION, or a CPU based upon the ARM architecture from ARM HOLDINGS. Other types of CPUs might also be utilized.

In one implementation, the chipset 304 includes a northbridge 306 and a southbridge 308. The northbridge 306 provides an interface between the CPU 302 and the remainder of the computer 300. The northbridge 306 also provides an interface to a random access memory ("RAM") used as the main memory 314 in the computer 300 and, possibly, to an on-board graphics adapter 312. The northbridge 306 can also provide functionality for enabling networking communication through a gigabit Ethernet adapter 310. The gigabit Ethernet adapter 310 is capable of connecting the computer 300 to another computer via a network. Connections that can be made by the Ethernet adapter 310 can include local area network ("LAN") or wide area network ("WAN") connections. LAN and WAN networking environments are commonplace in offices, enterprise-wide computer networks, intranets, and the Internet. The northbridge 306 is connected to the southbridge 308.

The southbridge 308 is responsible for controlling many of the input/output functions of the computer 300. In particular, the southbridge 308 can provide one or more universal serial bus ("USB") ports 316, a sound adapter 324, an Ethernet controller 334, and one or more general purpose input/output ("GPIO") pins 318. The southbridge 308 can also provide a system management bus 332 for use in managing the various components of the computer 300. Power management circuitry 326 and clock generation circuitry 328 can also be utilized during the operation of the southbridge 308.

The southbridge 308 can also provide a bus for interfacing peripheral card devices or add-in cards 330, such as a SCSI host bus adapter. In one configuration, the bus comprises a peripheral component interconnect ("PCI") bus. It should be appreciated that other types of add-in cards compatible with other types of bus standards might also be utilized. The add-in card 330 might also include an option ROM 331. As known to those skilled in the art, the option ROM 331 of an add-in card 330 contains program code executable by the CPU 302, such as a firmware driver 106 that is used to connect the device to the system once the option ROM 331 is loaded.

The southbridge 308 can also provide one or more interfaces for connecting mass storage devices to the computer 300. For instance, according to one configuration, the southbridge 308 includes a serial advanced technology attachment ("SATA") adapter for providing one or more SATA ports 320 and an ATA100 adapter for providing one or more ATA100 ports 322. The SATA ports 320 and the ATA100 ports 322 can be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 308 and the SCSI host bus adapter 330, and their associated computer-readable storage media, provide non-volatile storage for the computer 300. In addition to the mass storage device described above, the computer 300 can have access to other computer-readable storage media to store and retrieve information, such as program modules, data structures, or other data. It should be appreciated by those skilled in the art that computer-readable storage media is any available media that provides for the non-transitory storage of data that can be accessed by the computer 300.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Encoding the program modules can also transform the physical structure of the storage media. The specific transformation of physical structure can depend on various factors in different implementations of the disclosed technologies. Examples of such factors can include, but are not limited to: the technology used to implement the storage media; whether the storage media are characterized as primary or secondary storage; and the like. For example, if the storage media are implemented as semiconductor-based memory, the program modules can transform the physical state of a semiconductor memory when the software or firmware is encoded therein. In one particular example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

It should be appreciated that the program modules disclosed herein can include software instructions that, when loaded into the CPU 302 and executed, transform a general-purpose computing system into a special-purpose computing system customized to facilitate all, or part of, the operations disclosed herein. As detailed throughout this description, the program modules can provide various tools or techniques by which the computer 300 can participate within the overall systems or operating environments using the components, logic flows, and/or data structures discussed herein.

As shown in FIG. 3, a low pin count ("LPC") interface can also be provided by the southbridge 308 for connecting a "Super I/O" device 338. The Super I/O device 338 is responsible for providing a number of input/output ports, including a keyboard port, a mouse port, a serial interface, a parallel port, and other types of input/output ports. The LPC interface can also connect a computer storage media such as a ROM, EPROM, or a flash memory such as a non-volatile random access memory ("NVRAM") for storing the firmware 336 that includes program code containing the basic routines that help to start up the computer 300 and to transfer information between elements within the computer 300. As discussed above, in one configuration the firmware 336 is a firmware that is compatible with the UEFI Specification. As also discussed above, the firmware 336 can include the platform-to-driver configuration protocol 102 disclosed herein.

The LPC interface can also be utilized to connect a NVRAM 337 to the computer 300. The NVRAM 337 can be utilized by the firmware 336 to store configuration data for the computer 300. The configuration data for the computer 300 can also be stored on the same NVRAM 337 as the firmware 336.

The computer 300 can be implemented as an embedded control computer, a laptop, a server computer, a mobile device, a set-top box, a kiosk, a tablet or slate computing device, a vehicular information system, a mobile telephone, a customized machine, or other hardware platform. The CPU 302 can be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

The CPU 302 can be constructed from transistors and/or other circuit elements, which can individually or collectively assume any number of states. More specifically, the CPU 302 can operate as a state machine or finite-state machine. Such a machine can be transformed to a second machine, or a specific machine, by loading executable instructions contained within the program modules. These computer-executable instructions can transform the CPU 302 by specifying how the CPU 302 transitions between states, thereby transforming the transistors or other circuit elements constituting the CPU 302 from a first machine to a second machine, wherein the second machine can be specifically configured to perform the operations disclosed herein. The states of either machine can also be transformed by receiving input from one or more user input devices, network interfaces, other peripherals, other interfaces, or one or more users or other actors. Either machine can also transform states, or various physical characteristics of various output devices such as printers, speakers, video displays, or otherwise.

It should be appreciated that the various technologies disclosed herein can be implemented within other types of computing devices, including hand-held computers, embedded computer systems, smartphones, table or slate computing devices, personal digital assistants, or another type of computing device. It is also contemplated that the computer 300 might not include all of the components shown in FIG. 3, can include other components that are not explicitly shown in FIG. 3, or can utilize an architecture completely different than that shown in FIG. 3.

Figure 4:
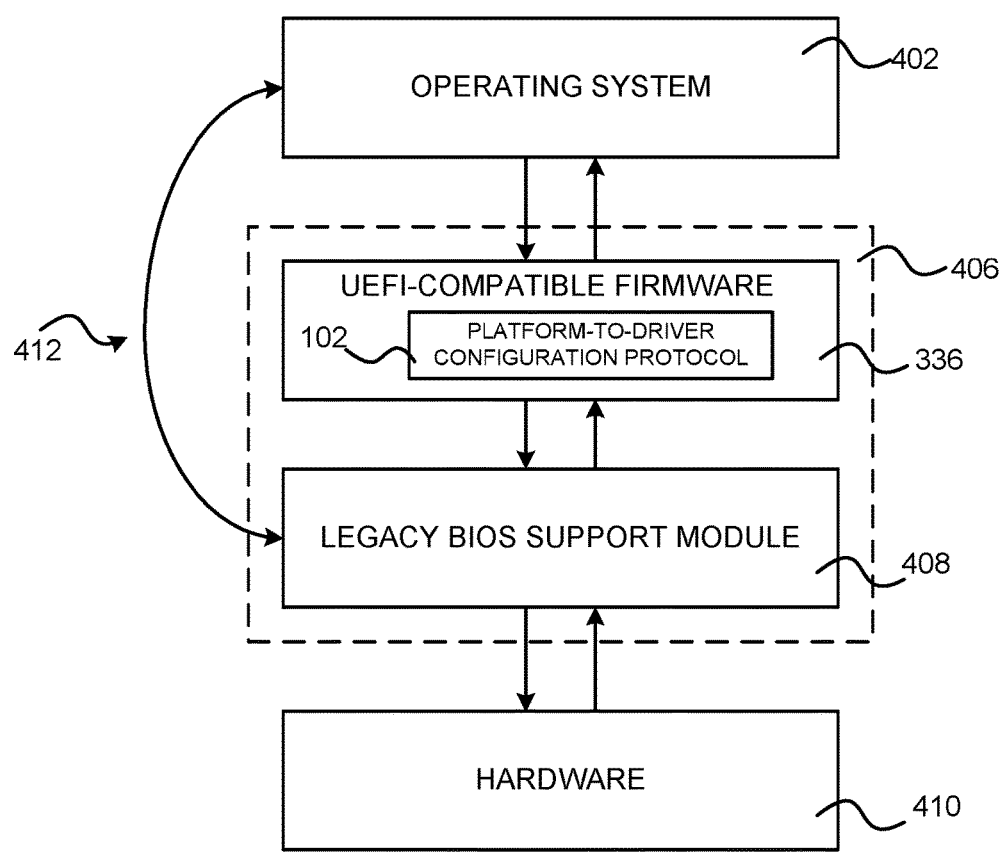
FIG. 4 is a software architecture diagram illustrating aspects of an interface between a UEFI Specification-compliant firmware and an operating system according to one or more configurations presented herein.

Referring now to FIG. 4, a software architecture diagram will be described that illustrates aspects of an interface between a UEFI-compatible firmware 336 and an operating system 402 according to one or more configurations presented herein. As described above, a firmware 406 can include a UEFI-compatible firmware that is compatible with the UEFI Specification. As mentioned above, the term "UEFI Specification" used herein refers to both the EFI Specification developed by INTEL CORPORATION and the UEFI Specification managed by the UEFI FORUM.

The UEFI Specification describes an interface between the operating system 402 and the UEFI-compatible firmware 336. The UEFI Specification also defines an interface that the firmware 336 can implement, and an interface that the operating system 402 can use while booting. How the firmware 336 implements the interface can be left up to the manufacturer of the firmware. The UEFI Specification also defines a way for the operating system 402 and firmware 336 to exchange information necessary to support the operating system boot process.

According to some configurations, both a UEFI-compatible firmware 336 and a legacy BIOS support module 408 can be present in the firmware 336. This allows the computer 300 to support a UEFI firmware interface and a legacy BIOS firmware interface. In order to provide this functionality, an interface 412 can be provided for use by legacy operating systems and applications. According to other configurations, only one of the UEFI-compatible firmware 336 and the legacy BIOS support module 408 are present in the firmware 406. According to yet other configurations, the firmware 336 can interface with the platform hardware 410 through any of various other architectures, components, or modules for the firmware without specific involvement of the UEFI-compatible firmware 336 or the legacy BIOS support module 408.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 5:
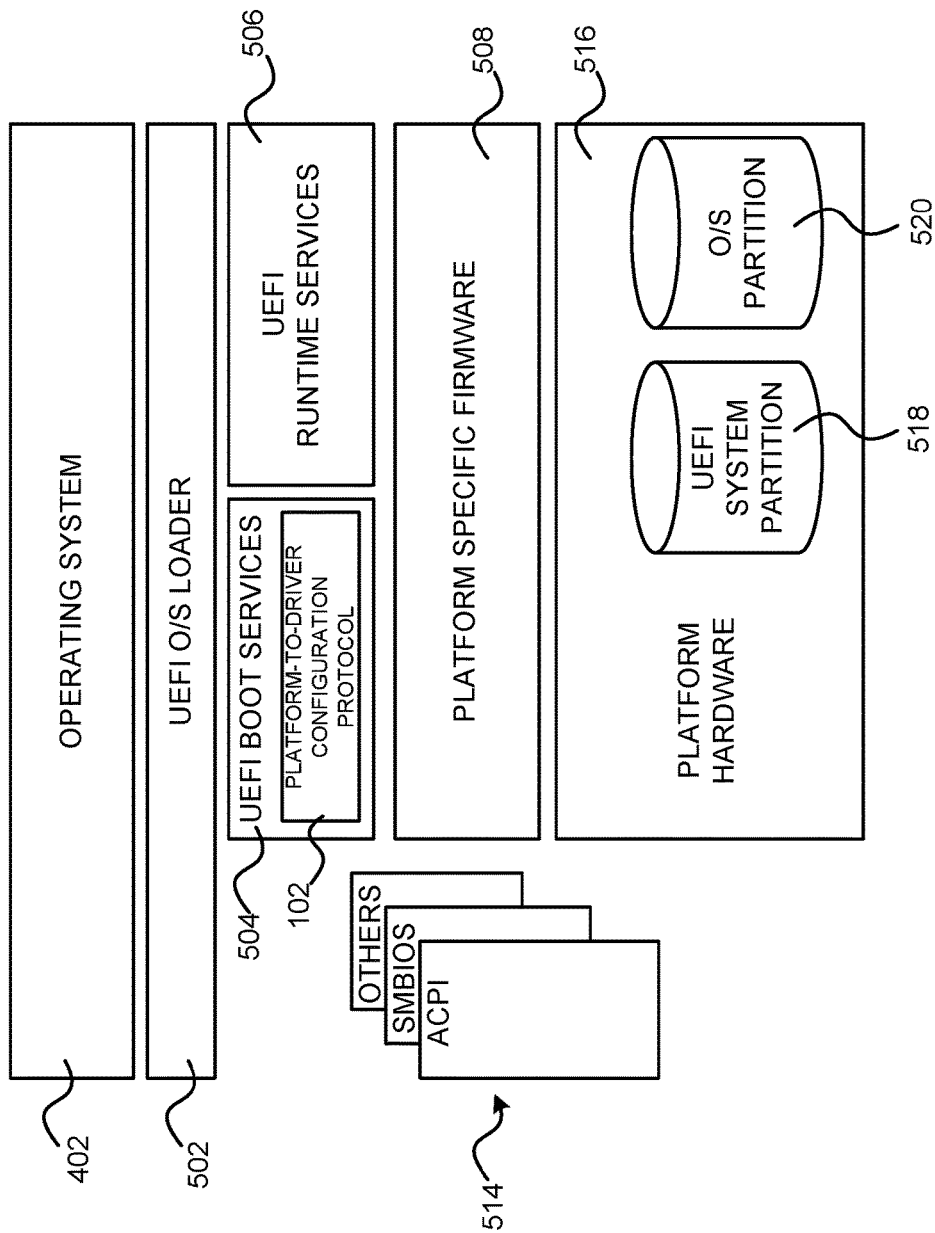
FIG. 5 is a software architecture diagram illustrating an architecture for a UEFI Specification-compliant firmware that provides an operating environment for one or more configurations presented herein.

Turning now to FIG. 5, a block diagram will be described that illustrates an architecture for a UEFI Specification-compliant firmware 336 that provides an operating environment for one or more configurations presented herein. As shown in FIG. 5, the architecture can include platform hardware 516 and an operating system 402. The platform specific firmware 508 can retrieve an operating system ("OS" or "O/S") image from the UEFI system partition 518 using an UEFI operating system loader 502. The UEFI system partition 518 can be an architecturally shareable system partition. As such, the UEFI system partition 518 can define a partition and file system designed to support safe sharing of mass storage between multiple vendors. An OS partition 520 can also be utilized.

Once started, the UEFI OS loader 502 can continue to boot the complete operating system 402. In doing so, the UEFI OS loader 502 can use UEFI boot services 504 and interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 504 can provide interfaces for devices and system functionality used during boot time, such as the platform-to-driver configuration protocol 102. UEFI runtime services 506 can also be available to the UEFI OS loader 502 during the boot phase. For example, a set of runtime services can be presented to ensure appropriate abstraction of base platform hardware resources used by the operating system 402 during its operation. UEFI allows extension of platform firmware by loading UEFI driver and UEFI application images which, when loaded, have access to UEFI-defined runtime and boot services.

It should be appreciated that technologies have been disclosed herein for obtaining platform-specific information in a firmware execution environment. It should also be appreciated that while the subject matter presented herein has been described primarily in the context of a firmware execution environment provided by a UEFI Specification-compatible firmware, it is to be understood that the configurations disclosed herein are not limited to use with a UEFI Specification-compatible firmware. Similar configurations can be utilized in other firmware execution environments, such as that provided by a firmware compatible with the OPEN FIRMWARE specification from SUN MICROSYSTEMS or another type of open or proprietary firmware.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes can be made to the subject matter described herein without following the example configurations illustrated and described, and without departing from the true spirit and scope of the present invention, which is set forth in the following claims.

The invention claimed is:

1. A computer-implemented method for obtaining platform-specific information in a firmware execution environment, comprising:

receiving a request for the platform-specific information from a firmware driver executing in the firmware execution environment;

discovering one or more platform-to-driver agents executing in the firmware execution environment, wherein the one or more platform-to-driver agents comprise unified extensible firmware interface (UEFI) compatible protocols;

querying at least a portion of the one or more platform-to-driver agents to identify one of the platform-to-driver agents as a provider of the requested platform-specific information;

obtaining the platform-specific information from the one of the platform-to-driver agents identified as a provider of the requested platform-specific information; and providing the platform-specific information to the firmware driver.

2. The method of claim 1, wherein the firmware execution environment is provided by a unified extensible firmware interface (UEFI) compatible firmware.

3. The method of claim 1, wherein the firmware driver comprises a unified extensible firmware interface (UEFI) compatible firmware driver.

4. The method of claim 1, further comprising establishing a communications session between the firmware driver and the one of the platform-to-driver agents identified as the provider of the requested platform-specific information.

5. The method of claim 1, further comprising exposing a unified extensible firmware interface (UEFI) compatible interface to the firmware driver for receiving the request for the platform-specific information.

6. The method of claim 1, wherein the platform-specific information comprises information that is specific to a hardware platform that provides the firmware execution environment.

7. The method of claim 1, wherein discovering the one or more platform-to-driver agents comprises using a UEFI-specific protocol discovery mechanism provided by UEFI Boot Services.

8. The method of claim 1, wherein the request for the platform-specific information comprises at least one of a controller handle or a child handle passed from the firmware driver.

9. The method of claim 8, wherein the querying at least a portion of the one or more platform-to-driver agents comprises generating a query that includes at least one of the controller handle or the child handle.

10. A non-transitory computer-readable storage medium having computer-executable instructions stored thereupon which, when executed by a computer, cause the computer to:

receive a request for platform-specific information from a firmware driver executing in a firmware execution environment, wherein the firmware execution environment comprises a driver execution environment (DXE);

identify one or more platform-to-driver agents executing in the firmware execution environment;

query at least one of the one or more platform-to-driver agents to identify one of the platform-to-driver agents as a provider of the requested platform-specific information;

obtain the platform-specific information from the one of the platform-to-driver agents identified as a provider of the requested platform-specific information; and provide the platform-specific information to the firmware driver.

11. The computer-readable storage medium of claim 10, wherein the firmware execution environment is provided by a unified extensible firmware interface (UEFI) compatible firmware and the firmware driver comprises a unified extensible firmware interface (UEFI) compatible compliant firmware driver.

12. The computer-readable storage medium of claim 10, having further computer-executable instructions stored thereupon to establish a communications session between the firmware driver and the one of the platform-to-driver agents identified as the provider of the requested platform-specific information.

13. The computer-readable storage medium of claim 10, having further computer-executable instructions stored thereupon to expose a unified extensible firmware interface (UEFI) compatible interface to the firmware driver for receiving the request for the platform-specific information.

14. The computer-readable storage medium of claim 10, wherein the one or more platform-to-driver agents comprise unified extensible firmware interface (UEFI) compatible protocols.

15. The computer-readable storage medium of claim 10, wherein the platform-specific information comprises information that is specific to the computer.

16. An apparatus comprising:
a central processing unit (CPU); and
a non-volatile memory storing a unified extensible firmware interface (UEFI)-compliant firmware which, when executed by the CPU, will cause the CPU to:
receive a request for platform-specific information from a firmware driver executing in conjunction with the UEFI-compliant firmware,
identify a plurality of platform-to-driver agents executing in conjunction with the UEFI-compliant firmware, the platform-to-driver agents implemented as UEFI-compatible protocols,
query at least two of the plurality of platform-to-driver agents to identify one of the platform-to-driver agents as a provider of the requested platform-specific information,
obtain the platform-specific information from the one of the platform-to-driver agents identified as the provider of the requested platform-specific information, and
provide the platform-specific information to the firmware driver.

17. The apparatus of claim 16, wherein the firmware driver comprises a unified extensible firmware interface (UEFI) compliant firmware driver and the platform-to-driver agents comprise unified extensible firmware interface (UEFI) compatible protocols.

18. The apparatus of claim 16, wherein the non-volatile memory stores further computer-executable instructions to establish a communications session between the firmware driver and the one of the platform-to-driver agents identified as the provider of the requested platform-specific information.

19. The apparatus of claim 16, wherein the non-volatile memory stores further computer-executable instructions to expose a unified extensible firmware interface (UEFI) compatible interface to the firmware driver for receiving the request for the platform-specific information.

20. The apparatus of claim 16, wherein the platform-specific information comprises a media access control (MAC) address of a network adapter.

* * * * *